United States Patent [19]
Stanson et al.

[11] 4,341,928
[45] Jul. 27, 1982

[54] RINGING SIGNAL SUPPLY

[75] Inventors: Mark V. Stanson, Ottawa; Garth I. Riley, Kanata, both of Canada

[73] Assignee: Northern Telecom Limited, Montreal, Canada

[21] Appl. No.: 229,166

[22] Filed: Jan. 28, 1981

[51] Int. Cl.³ .............................................. H04M 5/12
[52] U.S. Cl. .............................. 179/51 AA; 179/84 R; 363/74
[58] Field of Search .......... 179/51 AA, 18 HB, 17 E, 179/2.51, 84 R, 84 A; 363/40, 41, 74, 78, 63, 124

[56] References Cited

U.S. PATENT DOCUMENTS

| | | | |
|---|---|---|---|
| 3,205,424 | 9/1965 | Bates | 321/18 |
| 3,564,394 | 2/1971 | Opal et al. | 363/74 |
| 3,970,916 | 7/1976 | Kienscherf | 321/27 R |
| 4,056,693 | 11/1977 | Bosik et al. | 179/84 R |
| 4,220,826 | 9/1980 | Kiss | 179/51 AA |
| 4,244,015 | 1/1981 | Beebe | 363/41 |
| 4,244,016 | 1/1981 | Mitchell | 363/98 |
| 4,270,028 | 5/1981 | Young | 179/84 R |
| 4,282,410 | 8/1981 | Gauthier et al. | 179/51 AA |

Primary Examiner—Gerald L. Brigance
Attorney, Agent, or Firm—R. John Haley

[57] ABSTRACT

A ringing signal supply, provided at a concentrator remote from a switching office, compares a fraction of its output with a low level reference ringing signal supplied from the switching office, and uses the comparison result to control a high voltage chopper which connects one of two d.c. supply voltages via a low pass filter to the output to produce the ringing signal at a desired frequency. A d.c.-d.c. forward converter produces the two d.c. supply voltages commonly for a plurality of ringing signal supplies whenever at least one of them is to produce a ringing signal.

7 Claims, 3 Drawing Figures

RINGING SIGNAL SUPPLY

This invention relates to ringing signal supplies, for producing ringing signals for supply to telephone subscribers.

Ringing signal generators are provided in telephone exchanges or switching offices for generating the high level signals which are required for ringing subscribers' telephones. Typically the high level ringing signal is an 85 V RMS sinusoid, at a frequency of from 16 Hz to 67 Hz in the case of multi-frequency ringing. Where a group of subscribers is served by a concentrator which is remote from the switching office, the required high level ringing signals must be locally generated because high level ringing signals can not simply be supplied from the switching office via the concentrator to the subscribers' telephones. Especially in the case of multi-frequency ringing, however, it is still desirable for the switching office to supply to the concentrator a signal at the desired ringing frequency, in order to inform the concentrator of the ringing frequency which is to be supplied to a subscriber line. Such a reference ringing signal, being at a relatively low level, can be readily handled by the concentrator.

Accordingly, an object of this invention is to provide a ringing signal supply for producing a relatively high level ringing signal from a relatively low level reference ringing signal.

According to this invention there is provided a ringing signal supply comprising: a low pass filter whose output constitutes the output of the ringing signal supply; switching means for selectively connecting either of two d.c. supply voltages to an input of said low pass filter; means for comparing a representation of a signal at said output with a reference ringing signal; and means for controlling said switching means in dependence upon the comparison to produce a ringing signal, corresponding to said reference ringing signal, at said output.

Preferably the means for controlling the switching means comprises a bistable device, the switching means being responsive to each of the two states of the bistable device to connect a respective one of the two d.c. supply voltages to the input of the low pass filter.

The ringing signal supply preferably includes a d.c.-d.c. forward converter including a switching transistor which controls the operating frequency of the converter, for producing said two d.c. supply voltages from a d.c. voltage with which it is supplied, and the bistable device is preferably edge-triggered via a clock pulse input thereof, the ringing signal supply further including means for supplying a clock pulse sequence to the switching transistor and to the clock pulse input of the bistable device. The clock pulse sequence can have an arbitrary frequency (much higher than the ringing frequency) as far as the ringing signal supply itself is concerned, but for noise immunity considerations the clock pulse sequence is conveniently a clock signal derived from the concentrator, for example at a frequency of 24 kHz.

The invention also extends to a ringing signal supply arrangement comprising a plurality of ringing signal supplies, each as recited above, for producing individual ringing signals at respective outputs; a d.c.-d.c. forward converter for producing said two d.c. supply voltages, commonly for the plurality of ringing signal supplies, from a d.c. voltage with which the converter is supplied; and means for selectively activating said converter to produce said two d.c. supply voltages whenever at least one of the plurality of ringing signal supplies is required to produce a ringing signal at its output.

The invention will be further understood from the following description with reference to the accompanying drawings, in which.

Figure 1:
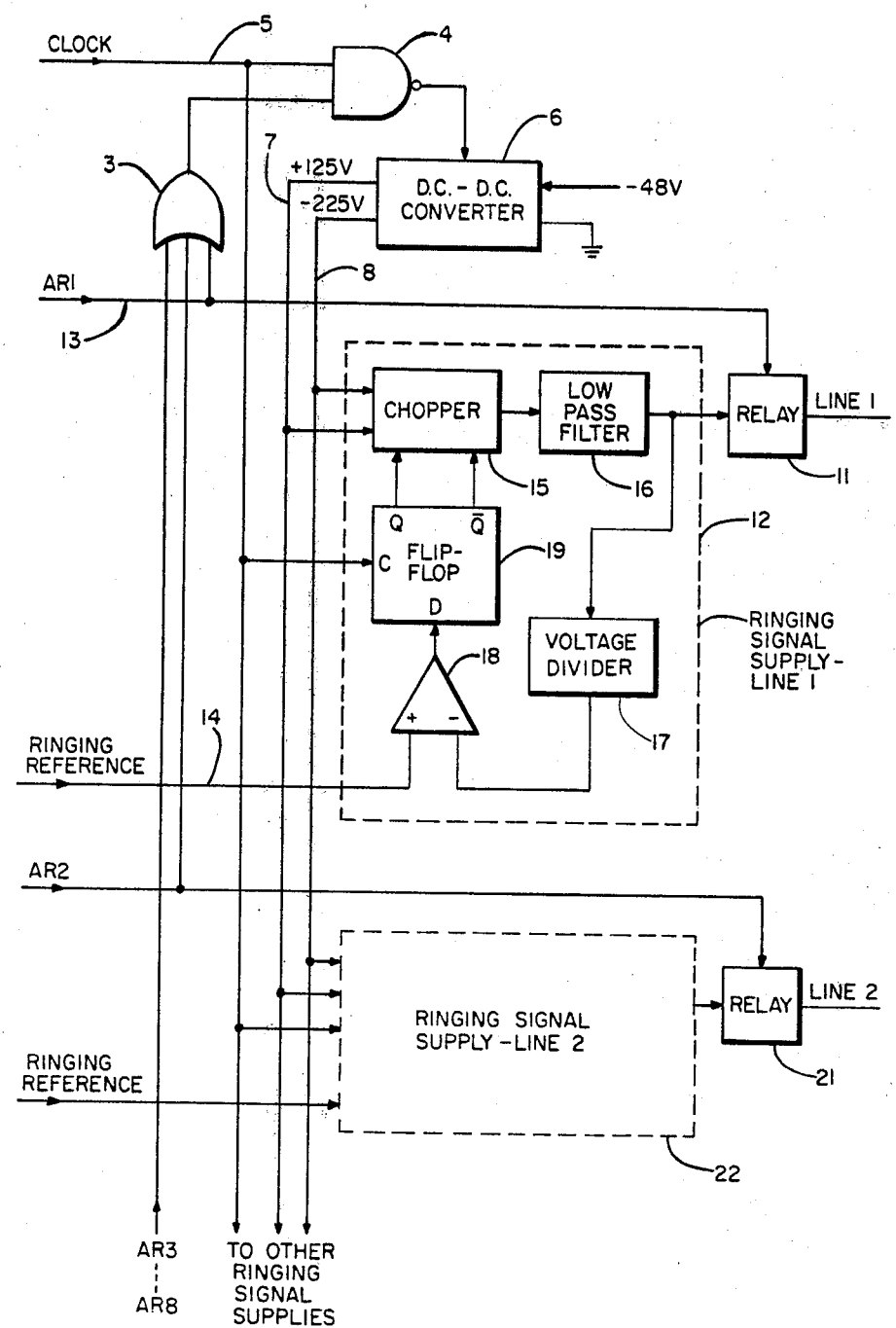
FIG. 1 illustrates in a block diagram a ringing signal supply arrangement according to the invention.

FIG. 1 illustrates a ringing signal supply arrangement which may be provided at a telephone subscriber concentrator which is remote from a telephone switching office. The arrangement serves for producing high-level ringing signals, for supply to the telephone subscriber stations, from low-level ringing signal frequency signals which are supplied from the switching office. The particular ringing frequencies used may be the same or different for different subscriber stations, the ringing frequencies for example being in the range from 16 to 67 Hz.

The arrangement of FIG. 1 serves for supplying ringing signals to one or more of a plurality of for example eight telephone subscriber lines, of which only two are shown and referenced LINE 1 and LINE 2. The arrangement includes an individual ringing signal supply and a relay associated with each such line. FIG. 1 illustrates the relay 11 and, in a dashed-line box, the ringing signal supply 12 associated with the line 1, and the relay 21 and supply 22 associated with the line 2. As the components associated with all of the lines are the same, only those for the line 1 are shown in detail and described below.

When a ringing signal is to be supplied to the line 1, the concentrator supplies a signal AR1=1 on a line 13, which causes the relay 11 to connect the output of the supply 12 to the line 1. This signal is also conducted via an 8-input OR gate 3, to the other inputs of which corresponding signals AR2 to AR8 associated with the other subscriber lines are supplied, to enable a NAND gate 4 to supply clock pulses from a line 5 to a d.c.-d.c. converter 6, which is thereby activated as described below. The clock pulses can have an arbitrary frequency; for convenience and noise immunity the concentrator clock frequency of 24 kHz is selected. When activated, the converter 6 produces, from a −48 volt supply, supply voltages of +125 V and −225 V on lines 7 and 8 respectively. These voltages are selected to have an average of about −48 V so that each generated ringing signal has a d.c. component of about −48 V.

The ringing signal supply 12 is supplied with the clock pulses on the line 5 and the supply voltages on the lines 7 and 8. With the occurrence of the signal AR1=1, the supply 12 is also supplied via a line 14 with a ringing reference signal which is supplied via the concentrator from the switching office. The ringing reference signal has the same frequency and waveform as the ringing signal which is required to be supplied to the line 1, but is of much smaller amplitude so that it can be conducted via the concentrator. For example, the ringing reference signal is a 1 V RMS sinusoid with a frequency of from 16 to 67 Hz.

In the supply 12, a chopper 15 connects one of the two supply voltages on the lines 7 and 8 to the input of a low pass filter 16, whose output constitutes the ringing signal. A representation of this output, produced by a voltage divider 17, is compared in a comparator 18 with the ringing reference signal on the line 14, and the resultant signal is clocked through an edge-triggered D flip-flop 19, to a clock input C of which the clock pulses on the line 5 are supplied, to control the chopper 15 via the flip-flop outputs Q and $\bar{Q}$. The arrangement is such that the output of the comparator 18, and hence of the flip-flop 19, is a rectangular wave of variable pulse width whose average value is a sinusoid at the desired ringing frequency. This square wave controls the chopper 15 whose output is smoothed by the filter 16, so that the desired high-level ringing signal is produced at its output.

Figure 2:
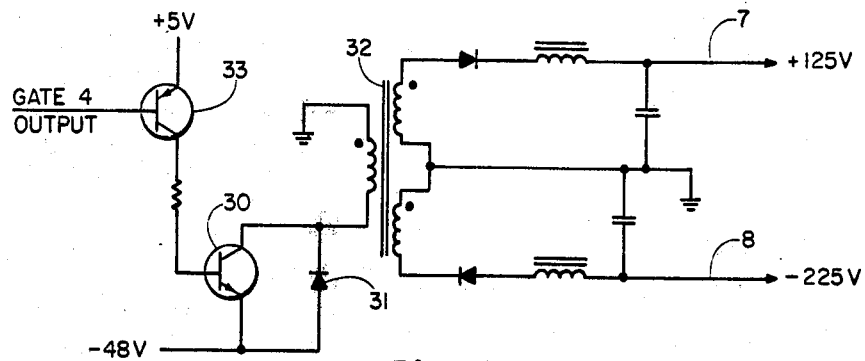
FIG. 2 illustrates a d.c.-d.c. converter of the arrangement of FIG. 1.

FIG. 2 illustrates the converter 6 in detail. As shown, this comprises a switching transistor 30 whose collector-emitter path, in parallel with a bypass diode 31, is connected between the −48 V supply and the primary of a transformer 32. Secondaries of the transformer 32 are connected via rectifiers and LC smoothing circuits to the lines 7 and 8 to produce the required supply voltages. The switching transistor 30 is controlled by the output of the gate 4 via a further switching transistor 33. If none of the signals AR1 to AR8 is a logic 1, i.e. if no ringing signal is to be supplied to the associated subscriber lines, then via the OR gate 3 the gate 4 is inhibited, so that neither of the transistors 30 and 33 conducts and the converter 6 does not operate, thereby conserving power. When any ringing signal is to be generated, the gate 4 is enabled via the gate 3 to supply the 24 kHz clock pulses to the transistor 33, so that the converter 6 is activated to operate at this frequency.

Figure 3:
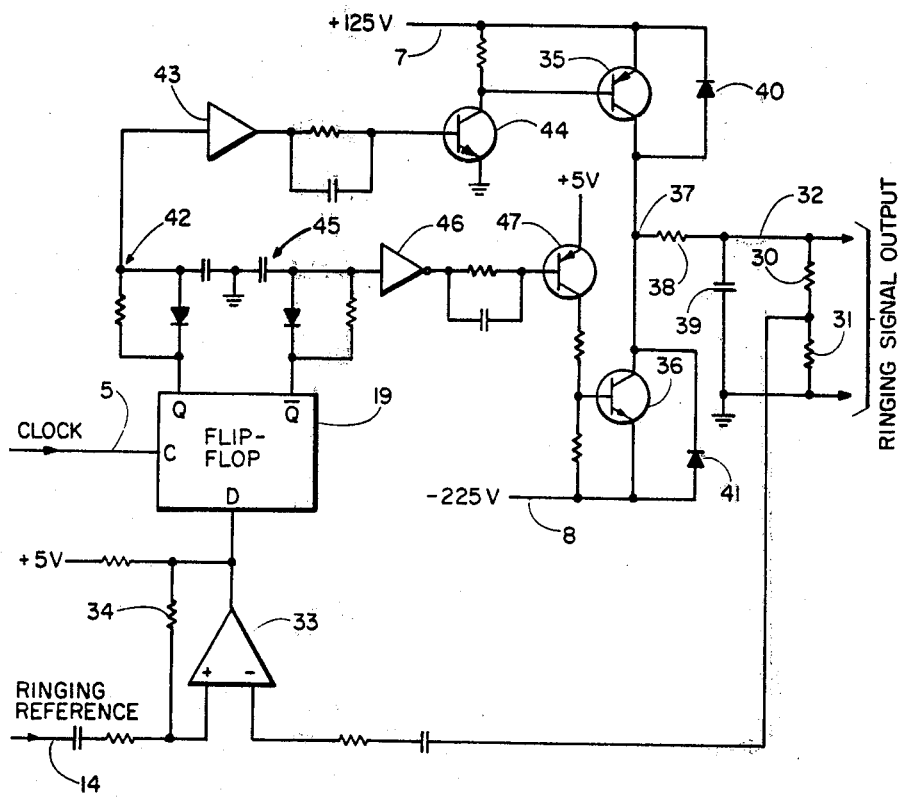
FIG. 3 illustrates in more detail a ringing signal supply of the arrangement of FIG. 1.

FIG. 3 illustrates the ringing signal supply 12 in greater detail. The voltage divider 17 is constituted by resistors 30 and 31 connected in series between a ringing signal output line 32 and ground. The junction between these resistors is a.c. coupled to the inverting input, and the ringing reference signal on the line 14 is a.c. coupled to the non-inverting input, of a differential amplifier 33 which constitutes the comparator 18. A feedback path including a resistor 34 connected between the output and non-inverting input of the amplifier 33 provides hysteresis in the switching of the comparator. The output of the amplifier 33 is connected to the data input D of the flip-flop 19.

The chopper 15 includes switching transistors 35 and 36 whose controlled paths are connected between the respective supply voltage lines 7 and 8 and a junction 37. The junction 37 constitutes the output of the chopper and is connected to the line 32 via the low pass filter 16, which is constituted by a series resistor 38 and a shunt capacitor 39. Reverse-biassed diodes 40 and 41 are connected between the junction 37 and the lines 7 and 8 respectively. The transistor 35 is controlled by the Q output of the flip-flop 19 via a delay circuit 42, a non-inverting buffer 43, and a driver transistor 44, and the transistor 37 is controlled by the $\bar{Q}$ output of the flip-flop 19 via a delay circuit 45, an inverting buffer 46, and a driver transistor 47. The delay circuits 42 and 45, each of which comprises a series resistor, in parallel with a diode, and a shunt capacitor, are provided in order to prevent simultaneous conduction of the transistors 35 and 36.

The described ringing signal supply conveniently produces a ringing signal of suitably high level, e.g. 85 V RMS with a −50 V d.c. component, with the frequency and waveshape of the ringing reference signal. As the ringing frequency is determined by the reference signal and not by any components within the supply itself, the supply can be used for arbitrary ringing frequencies and different frequencies can be supplied simultaneously via different supplies 12, 22, . . . to respective telephone subscriber lines.

Whilst a particular embodiment of the invention has been described in detail, it should be appreciated that numerous modifications, adaptations, and variations may be made without departing from the scope of the invention as defined by the claims.

What is claimed is:

1. A ringing signal supply comprising:
   a low pass filter whose output constitutes the output of the ringing signal supply;
   switching means for selectively connecting either of two d.c. supply voltages to an input of said low pass filter;
   means for comparing a representation of a signal at said output with a reference ringing signal; and
   means, comprising a bistable device, responsive to the comparing means for controlling said switching means in dependence upon the comparison to produce a ringing signal, corresponding to said reference ringing signal, at said output;
   the switching means being responsive to each of the two states of the bistable device to connect a respective one of the two d.c. supply voltages to the input of the low pass filter.

2. A ringing signal supply as claimed in claim 1 and including a d.c.-d.c. forward converter for producing said two d.c. supply voltages from a d.c. voltage with which it is supplied.

3. A ringing signal supply as claimed in claim 1 and including a d.c.-d.c. forward converter for producing said two d.c. supply voltages from a d.c. voltage with which it is supplied, wherein the bistable device is edge-triggered via a clock pulse input thereof, the ringing signal supply further including means for supplying a clock pulse sequence to the switching transistor and to the clock pulse input of the bistable device.

4. A ringing signal supply as claimed in claim 1, 2, or 3 wherein the average of said two d.c. supply voltages is about −48 volts.

5. A ringing signal supply arrangement comprising a plurality of ringing signal supplies each as claimed in claim 1 for producing individual ringing signals at respective outputs; a d.c.-d.c. forward converter for producing said two d.c. supply voltages, commonly for the plurality of ringing signal supplies, from a d.c. voltage with which the converter is supplied; and means for selectively activating said converter to produce said two d.c. supply voltages whenever at least one of the plurality of ringing signal supplies is required to produce a ringing signal at its output.

6. A ringing signal supply arrangement as claimed in claim 5 wherein said converter includes a switching transistor which controls the operating frequency of the converter and wherein the bistable device of each ringing signal supply is edge-triggered via a clock pulse input thereof, the arrangement further including means for applying a clock pulse sequence to the clock pulse input of the bistable device of each ringing signal supply and via said selectively activating means to said switching transistor of the converter, the selectively activating means being arranged to inhibit the supply of the clock pulse sequence to the switching transistor when none of the ringing signal supplies is required to produce a ringing signal at its output.

7. A ringing signal supply arrangement as claimed in claim 5 or 6 wherein the average of said two d.c. supply voltages is about −48 volts.

* * * * *